(12) United States Patent
Simpson et al.

(10) Patent No.: US 6,578,089 B1
(45) Date of Patent: Jun. 10, 2003

(54) MULTI-COMPUTER ACCESS SECURE SWITCHING SYSTEM

(75) Inventors: John P. Simpson, Ottawa (CA); Michael H. Wong, Nepean (CA); Frank O. Blasioli, Nepean (CA)

(73) Assignee: Emcon Emanation Control Ltd., Nepean (CA)

( * ) Notice: Subject to any disclaimer, the term of this patent is extended or adjusted under 35 U.S.C. 154(b) by 0 days.

(21) Appl. No.: 09/293,802

(22) Filed: Apr. 19, 1999

(51) Int. Cl.[7] .......................... H05K 9/00; G06F 9/455; G06F 11/30
(52) U.S. Cl. ..................... 709/249; 713/201; 710/316; 307/91
(58) Field of Search ..................... 307/91, 89; 710/131, 710/132, 316; 709/250, 249; 713/201, 202

(56) References Cited

U.S. PATENT DOCUMENTS

| | | | | |
|---|---|---|---|---|
| 4,243,890 A | * | 1/1981 | Miller et al. | 250/551 |
| 5,033,813 A | * | 7/1991 | Westfall | 385/16 |
| 5,499,377 A | | 3/1996 | Lee | 709/244 |
| 5,777,400 A | * | 7/1998 | Bouthillier | 307/91 |
| 5,841,120 A | * | 11/1998 | Bouthillier et al. | 235/382 |
| 5,894,551 A | * | 4/1999 | Huggins et al. | 713/201 |
| 5,894,552 A | * | 4/1999 | Bouthillier et al. | 713/201 |
| 5,996,077 A | * | 11/1999 | Williams | 713/201 |
| 6,012,632 A | * | 1/2000 | Bouthillier et al. | 235/375 |
| 6,021,497 A | * | 2/2000 | Bouthillier et al. | 713/202 |
| 6,026,502 A | * | 2/2000 | Wakayama | 714/38 |
| 6,092,724 A | * | 7/2000 | Bouthillier et al. | 235/380 |
| 6,108,787 A | * | 8/2000 | Anderson et al. | 713/201 |
| 6,219,792 B1 | * | 4/2001 | Bouthillier et al. | 713/201 |
| 6,272,533 B1 | * | 8/2001 | Browne | 709/213 |
| 6,351,817 B1 | * | 2/2002 | Flyntz | 713/202 |
| 6,389,542 B1 | * | 5/2002 | Flyntz | 713/201 |

FOREIGN PATENT DOCUMENTS

| | | | |
|---|---|---|---|
| GB | 2306862 A | * | 5/1997 |
| GB | 2358996 A | * | 8/2001 |
| WO | WO 96/30840 | * | 10/1996 |

OTHER PUBLICATIONS

Security Feature for Local Area Network Switches; IBM TDB vol. 29, Issue 9; pp. 137–144; Sep. 1996.*
Network Security Switch; www.perfcomcat.com/ssw50607.htm; publication date unknown.*
EMCON DeskSaver; product description; www.emcon.com/products/desksaver; Nov. 2001.*
Military Handbook: Red/Black Engineering–Installation Guidelines; MIL–HDBK–232A; http://www.tscm.com/TSCM101tempest.html; pp. 1–126; Mar. 1987.*

* cited by examiner

*Primary Examiner*—Kenneth R. Coulter
(74) *Attorney, Agent, or Firm*—Freedman & Associates (57) ABSTRACT

A secure switch for connecting a plurality of computer systems to a single monitor and keyboard is disclosed. The system provides a first coupling section for coupling to a first monitor, a second coupling section for coupling to a second monitor, the first coupling section electrically and electromagnetically isolated from the second coupling section. A switching section isolated from each of the coupling sections.

20 Claims, 6 Drawing Sheets

MULTI-COMPUTER ACCESS SECURE SWITCHING SYSTEM

FIELD OF THE INVENTION

This invention relates to computers and more specifically to a switch for selectively linking individual computers to a work centre in a secure fashion.

BACKGROUND OF THE INVENTION

In order to implement high security applications, secure computers are used. One standard for secure computers is the TEMPEST standard. These secure computers prevent access to information stored therein by unauthorised individuals. Commonly, these computers are either stand alone computers or are networked with other similar secure computers. Thus, many high security establishments have what is termed secure networks.

Unfortunately, some individuals within these organisations require access to a wide area network such as the Internet. Any connection to the Internet from a secure network reduces security and is thus not really possible within current secure network standards. Therefore, most high security establishments run two networks simultaneously, one being a secure network and the other being a regular, unsecured, network. Many individuals within these organisations have at their desk two work centres each having a monitor keyboard and mouse and each for controlling a different computer. The computers are spaced by at least a predetermined distance to prevent information in the form of electromagnetic radiation from coupling from the secure system to the unsecured system.

The space occupied by the two work centres is significant in relation to current "cubicle" size. This often results in discomfort to employees and in reduced overall productivity. U.S. Pat. No. 5,499,377 discloses a connector for connecting a single monitor and keyboard to a plurality of computers. Such a system reduces the space required for two computers by limiting a system to one monitor, keyboard, and mouse. The system is complicated and does not maintain any security; enhancement of the system to account for security is not straightforward and may not be possible. According to the background in that patent, mechanical switches have been employed for accomplishing selective communication between a work centre and any of a plurality of computers. More effective communication also has been accomplished using electronic switches along with various features such as automatic booting and video signal refinement.

One prior form of switching system utilizes a work centre or console work centre with individual cables extending to each of the several computers. By actuating the console, selective communication can be established through one of the cables for a selected computer. Although such systems have been effective, the volume of cable often is troublesome and difficult to accommodate. For example, numerous cables extending from multiple individual computers to the console frequently present a substantial problem. Accordingly, a need exists for a switching system enabling access from a single work centre (video monitor, keyboard and mouse) to any of a plurality of computers.

Unfortunately, such a system is useless for switching between a secure computer and an insecure computer. Signals within the switching device propagate from one computer to the other. In essence, the resulting system reduces the security of the secure network to that of the unsecured network. This is completely unacceptable in most security related applications. Further, the isolation requirements between systems currently achieved through spacing—are not met with such a switch.

It is an object of the present invention to provide a switch for connecting a single monitor, keyboard, and mouse to a plurality of computers some of which are in communication with secure networks and some of which are in communication with unsecured networks.

SUMMARY OF THE INVENTION

In accordance with the present invention there is provided a multi-computer input/output port switching system for accessing a plurality of computers from a single work centre, said work centre including input/output devices, the switching system comprising:

a first coupling system for coupling to a first computer system;

a second coupling system for coupling to second computer system;

a switch having a first port for coupling to the first coupling system, a second port for coupling to the second coupling system, and a third port for coupling to the input/output devices, the switch for selecting one of signals received at the first port and signals received at the second port for provision to the third port; and, an isolator for electrically and electromagnetically isolating the first coupling system from the second coupling system.

In accordance with the present invention there is provided a multi-computer input/output port switching system for accessing a plurality of computers from a single work centre, said work centre including input/output devices:

a housing having a first compartment, a second compartment, and a third compartment, each compartment shielded to provide electromagnetic isolation therebetween;

a first coupling system for coupling to a first computer system, the first coupling system disposed within the first compartment and comprising a keyboard emulator, a mouse emulator, a plurality of isolating switches, and a first output port;

a second coupling system for coupling a to second computer system, the second coupling system disposed within the second compartment and comprising a keyboard emulator, a mouse emulator, a second plurality of isolating switches, and a second output port;

a switch disposed within the third compartment and having a first port for coupling to the first output port, a second port for coupling to the second output port, and a third port for coupling to the input/output devices, the switch manually operable for providing a control signal to each of the first coupling system and the second coupling system for selectively operating the first plurality of isolating switches and the second plurality of isolating switches wherein switching the first plurality of isolating switches to an closed state is only possible when the second plurality of isolating switches are in an open state.

BRIEF DESCRIPTION OF THE DRAWINGS

A description of an embodiment of the invention follows with reference to the following drawings in which similar items are designated with similar reference numerals and in which.

DETAILED DESCRIPTION OF THE PREFERRED EMBODIMENT OF THE INVENTION

Figure 1:
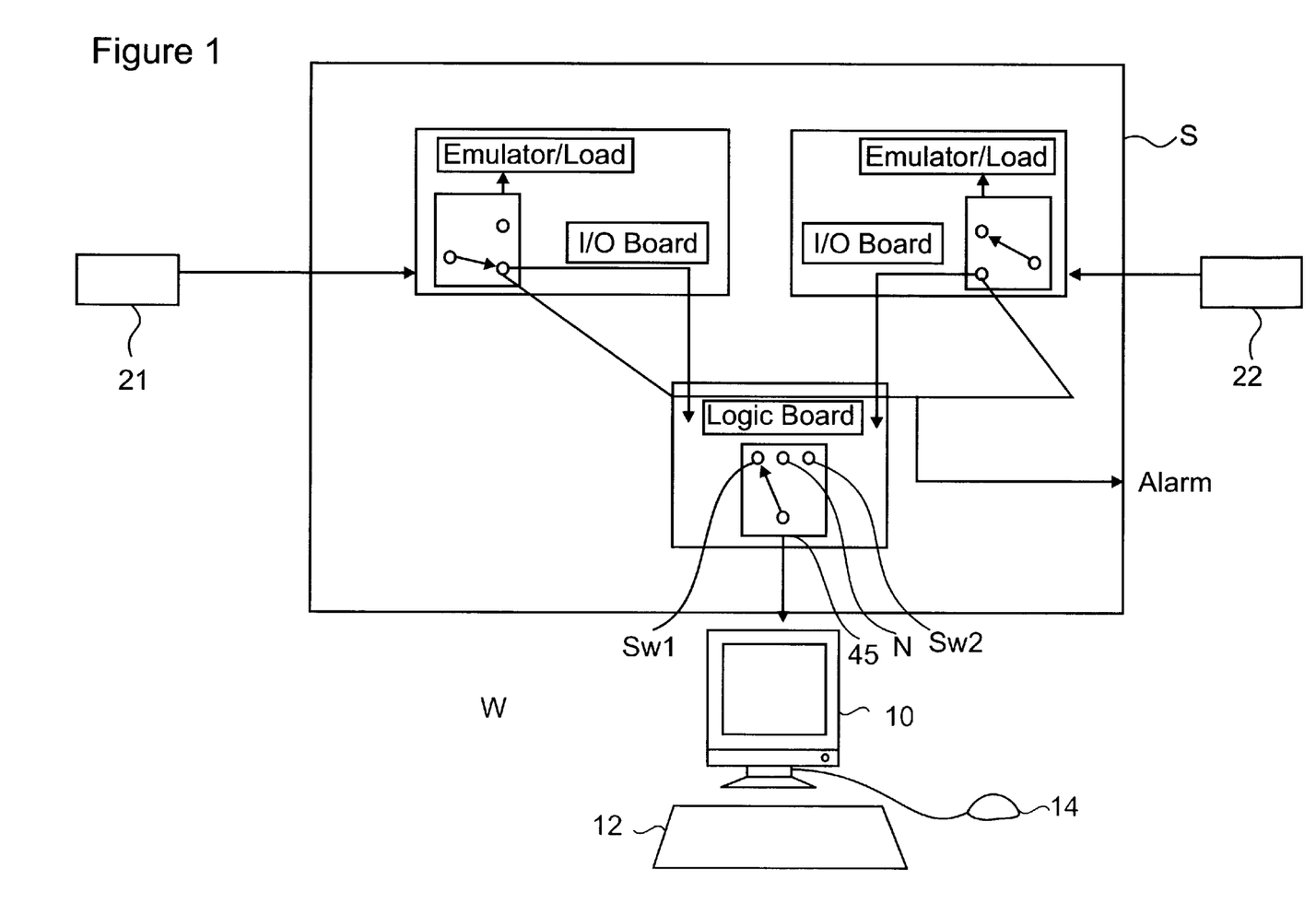
FIG. 1 is a simplified block diagram illustrating a system having two computers and one work centre in accordance with the present invention.

Referring to FIG. 1, a work centre W including a display device in the form of a video monitor 10, a text entry device in the form of a keyboard 12 and a pointing device in the form of a mouse 14 is shown connected to a selector S which is in turn connected to a plurality of personal computers 21 and 22. Specifically, two computer types are illustrated. Computer 21 is a secure computer and computer 22 is an unsecured computer. Of course, any number of computers of any number of security levels is possible in accordance with security and design guidelines. As is evident to those of skill in the art of computer security, it is preferable that the secure computer 21 and the unsecured computer 22 are physically separated by a distance d sufficient to provide electromagnetic isolation therebetween. Alternatively, another form of isolation is disposed between the secure and unsecured computers 21 and 22.

Generally, the system of the present invention involves switching operations to selectively place the work centre W in communication with any one of the personal computers 21 and 22 while isolating the systems 21 and 22 from each other in a secure fashion. Accordingly, from the work centre W, communication can be established with any of the personal computers 21 and 22 in isolation and at different times.

The input/output devices of the work centre W are coupled to the selector S. The selector S is connected to each of the computers 21 and 22. The connection from the selector S is essentially through insulated cables to each of the devices including the monitor, keyboard, mouse and the two computers. The cables provide electromagnetic isolation. Cables of this type are well known in the art.

Though the selector S is positioned proximate the work centre W in FIG. 1 this is not necessary. Embodiments wherein the selector S is not proximate the work centre are also possible in accordance with the invention. A manual switch 45 is used to switch signals provided from each input/output device to either the secure computer 21 or the unsecured computer 22. Preferably a neutral switch setting wherein no computers are coupled to the work centre W through the selector S exists between each active switch setting. In FIG. 1, this is shown as a third switch setting N between the switch settings for SW1 and SW2.

Figure 2:
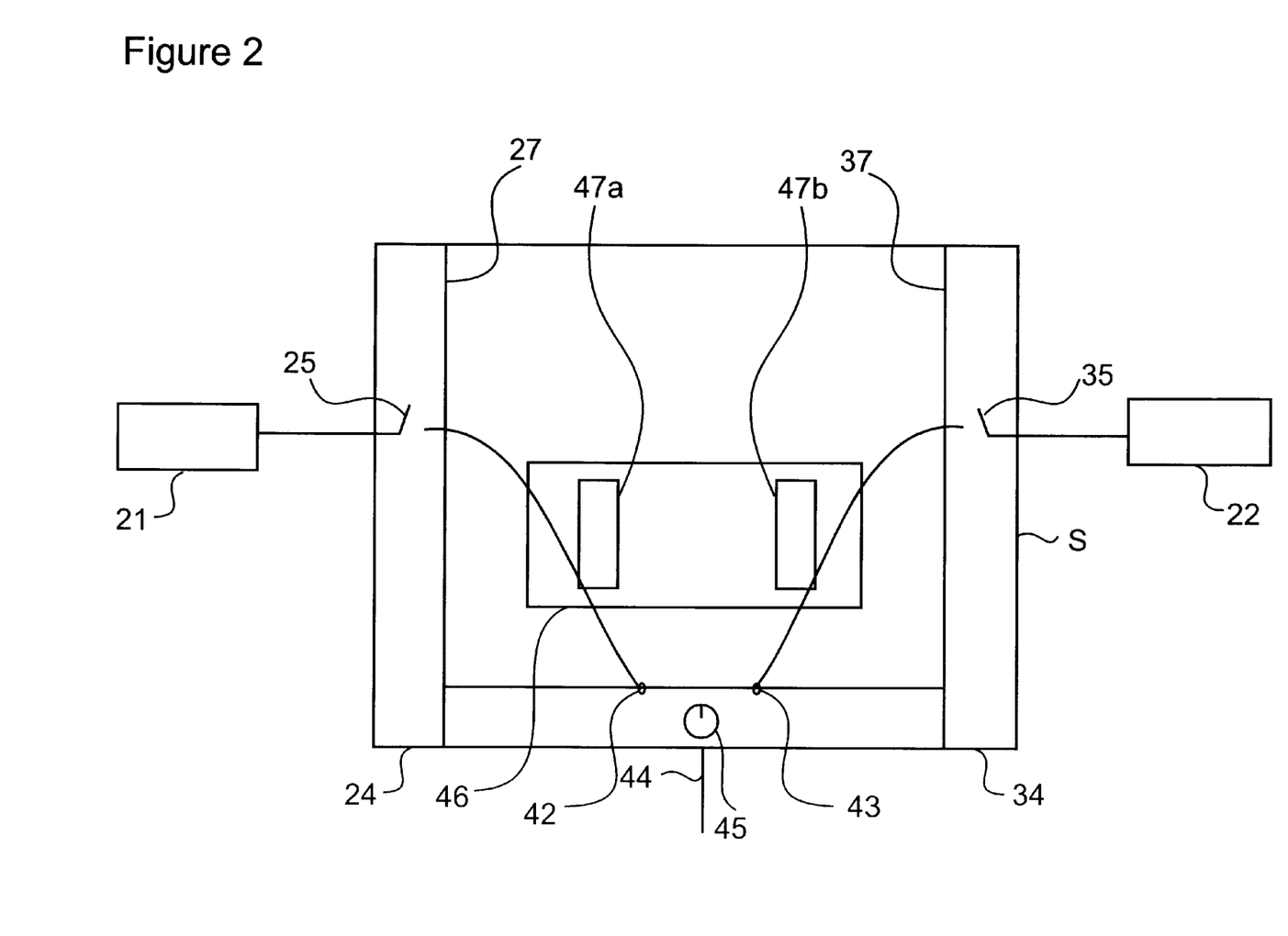
FIG. 2 is a block diagram of a switch as shown in FIG. 1 illustrating isolation between subsections of the switch in accordance with the invention.

Referring to FIG. 2, a block diagram of the switching circuitry within the selector S is shown. A first coupling system 24 comprises a first circuit 25 for coupling to a secure computer system 21. The first circuit 25 is shielded by a ground plane 27 preventing electromagnetic coupling of electrical signals therein with any other circuit in the selector S. A second coupling system 34 comprises a second circuit 35 for coupling to the unsecured computer system 22. The second circuit 35 is shielded by a ground plane 37 preventing electromagnetic coupling of electrical signals therein with any other circuit in the selector S.

A switch 41 having a first port 42 for coupling to the first coupling system 24, a second port 43 for coupling to the second coupling system 34, and a third port 44 for coupling to the input/output devices controls switching operation of the device. The switch 41 is for selecting between signals received at the first port and the second port for provision to the third port. The switch 41 comprises a manually operable switch 45 for selecting between coupling the third port 44 to one of the first port 42 and the second port 43. The switch 41 comprises an isolator 46 for electrically and electromagnetically isolating the first coupling system 24 from the second coupling system 34.

The isolator 46 comprises sets of relay 47a and 47b. The set of relays 47a is for coupling to the first coupling system 24 and the switch 41. The relays 47b are for coupling to the second coupling system 34 and the switch 41. In a first state, the relays are closed and provide coupling of signals between the switch 41 and a coupling system 24 or 34. In a second state, the relay switches are open and provide isolation between the switch 41 and a coupling system 24 or 34. The relays 47a and 47b are responsive to a control signal from the manually operable switch 45. The relays 47a and 47b are operable such that the relays in set 47a and those in set 47b are not in the first state—closed—at a same time. Of course, the relays in different sets 47a and 47b may be in the second state—open—at a same time.

Preferably, the manually operable switch 45 is provided with a switch setting for closing the relay switches 47a, another switch setting for opening all relay switches 47a and 47b, and a third switch setting for closing relay switches 47b. In this design, all relays 47a and 47b are provided sufficient time to open before any relays 47a or 47b are closed. This enhances isolation between the first coupling system 24 and the second coupling system 34.

Figure 3:
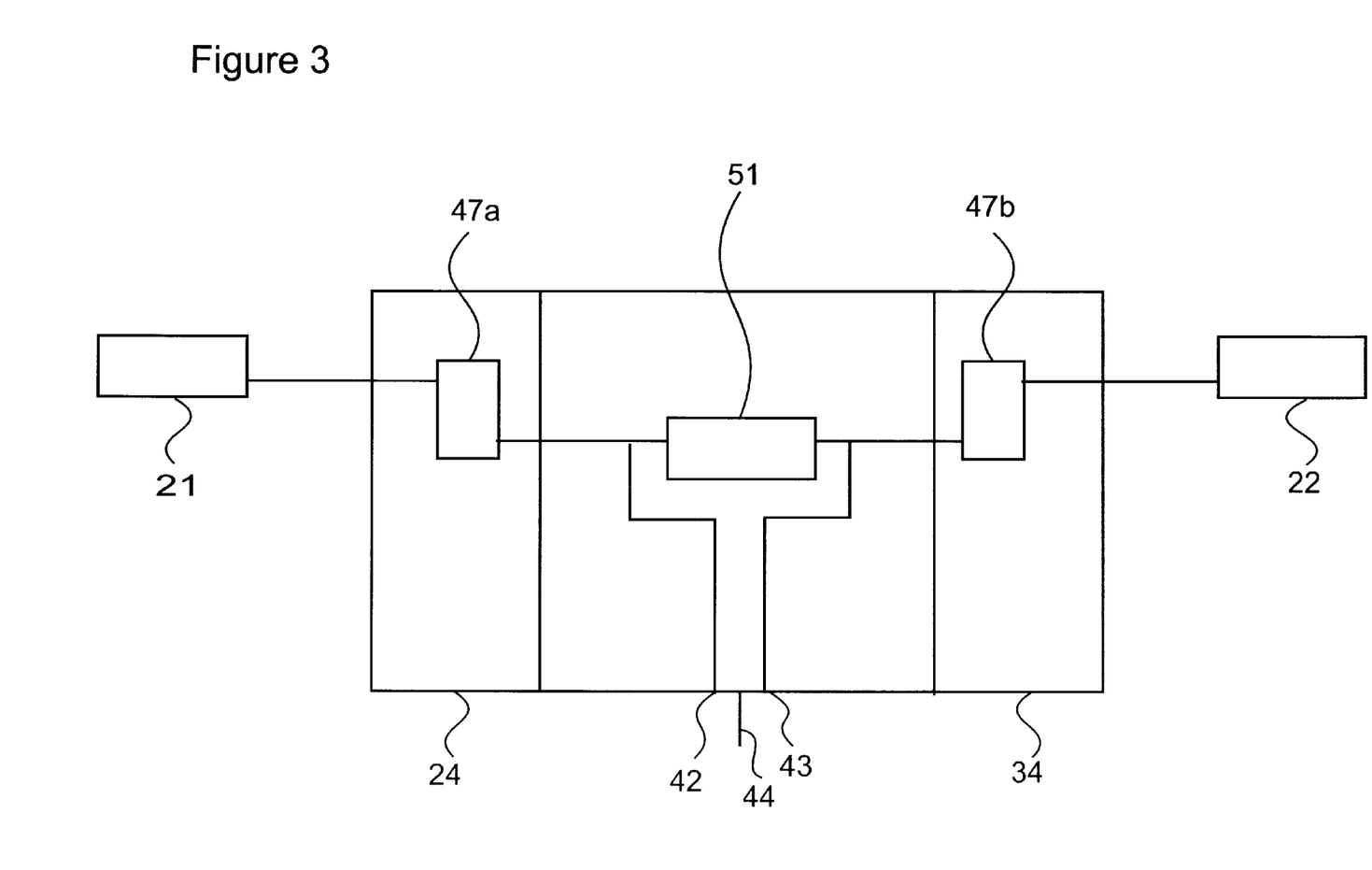
FIG. 3 is a simplified block diagram of a switch comprising detection circuitry for detecting fault operation of the switch.

Referring to FIG. 3, a selector S as described with reference to FIG. 2 is shown further comprising detection circuitry 51 for detecting a presence of signals and for providing a control signal, the control signal indicative of potential coupling of signals from at least one of the first and second coupling systems to the other coupling system.

During use, the detection circuitry 51 monitors signals at each of the first port 42 and the second port 43 and when signals are present at each of the first and second ports simultaneously, the detection circuitry 51 provides a signal for causing all the relay switches 47a and 47b to open. In this fashion, isolation is maintained even during switch failure. Alternatively, the detection circuitry 51 is responsive to the switch setting and monitors only those ports coupled with open relay switches in order to ensure that no data is present at those ports. When data is present at those ports, the selector S is disabled to maintain isolation. When disabled, preferably all isolating switches provide isolation. For example, the relay switches are open. Alternatively, optical isolating switches are disabled.

Of course when other forms of isolating switches such as optical switches are used, the detection circuitry 51 is appropriate to those isolating switches. The use of the detection circuitry 51 enables the selector S to provide security from cross-coupling even during failure of some isolating switches 47a and 47b. This improves the security level provided by the selector S in order to meet a range of security requirements.

The detection circuitry 51 commonly forms part of the switch. Of course, as shown in FIG. 3 by the dashed box, the detection circuitry 51 may be considered to include the control system that opens the isolating switches upon detection of potential cross-coupling. Alternatively, the detection circuitry 51 forms part of each coupling system. In a further alternative embodiment, the detection circuitry 51 forms part of only one coupling system and controls all isolating switches in the coupling system and other coupling systems.

Figure 4:
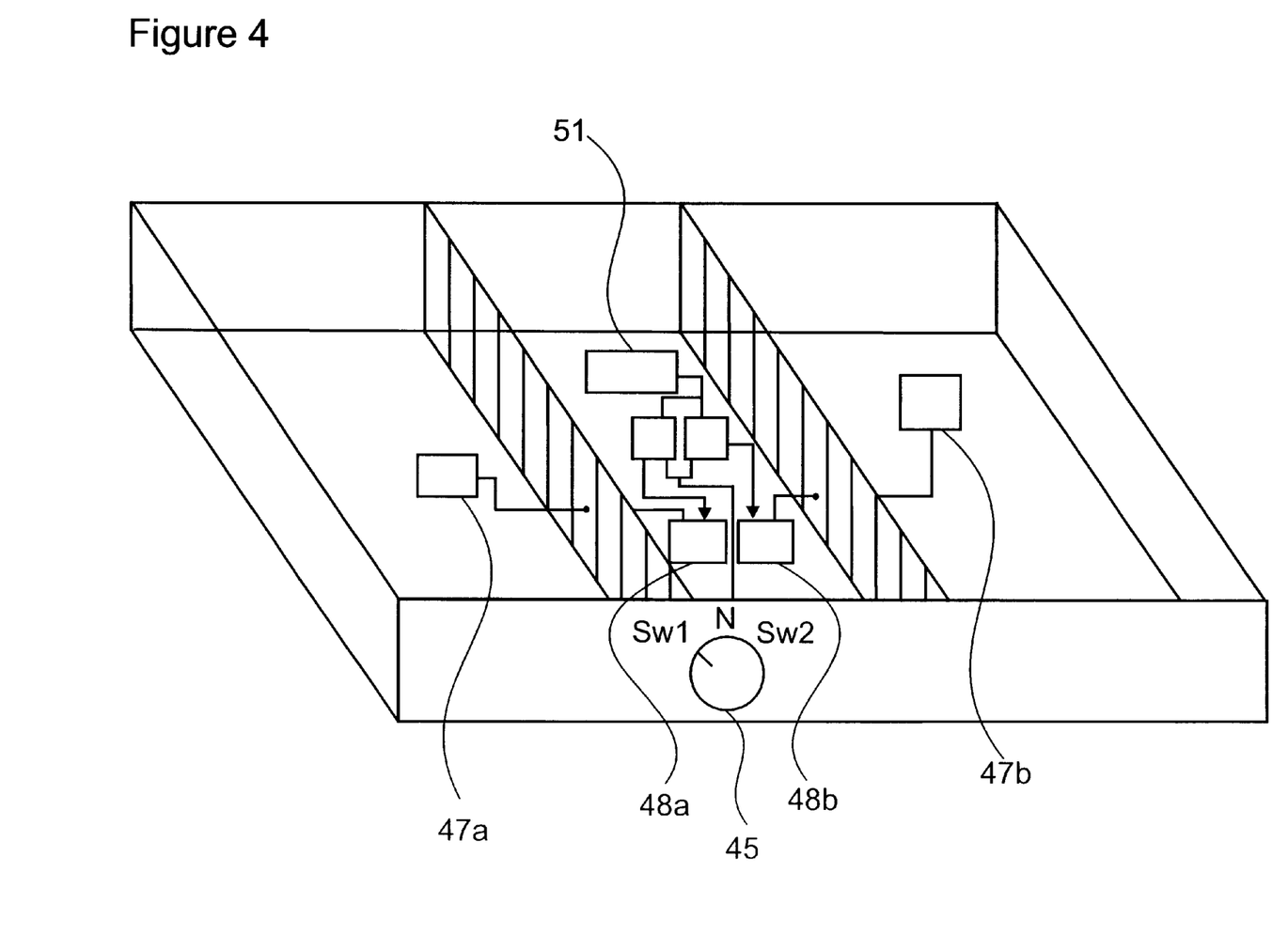
FIG. 4 is a simplified diagram of a controller for use with the switch shown in FIG. 3.

Referring to FIG. 4, a controller within the selector S is shown for controlling isolating switch operation. Each isolating switch has two states of operation, open and closed. The manually operated switch 45 provides a control signal to each of two amplifiers 48a and 48b. The amplifiers drive the isolating switches 47a and 47b in the form of relay switches. Each amplifier is provided a separate control signal from secure but simple logic. Simpler logic assures that security is more easily tested. For example the following logic when implemented in discreet circuitry is simple and secure, (first switch setting) AND NOT (third switch setting) AND NOT (detected cross-coupling)

provided to an amplifier coupled with the relay switches 47a and (third switch setting) AND NOT (first switch setting) AND NOT (detected cross-coupling)

provided to an amplifier coupled with the relay switches 47b.

This logic ensures that the first and third switch settings are not simultaneously enabled due, for example, to switch error, corrosion, damage, and so forth. The logic also ensures that cross-coupling detected during use results in disabling of the selector S. Therefore, this simple logic ensures that security is maintained in most situations.

In an embodiment of the invention the isolating switches comprise electronic solid state analogue switches is shown. For example, some military grade analogue switches provide significant electromagnetic and electrical isolation as necessary to provide security according to the invention. One of skill in the art is capable of determining those analogue switches that meet necessary security requirements and those that do not. Some experimentation may be required to ensure that specific design requirements are met. That said, when detection circuitry 51 is included within the selector S, the selector will only perform as desired when sufficient isolation exists.

Figure 5:
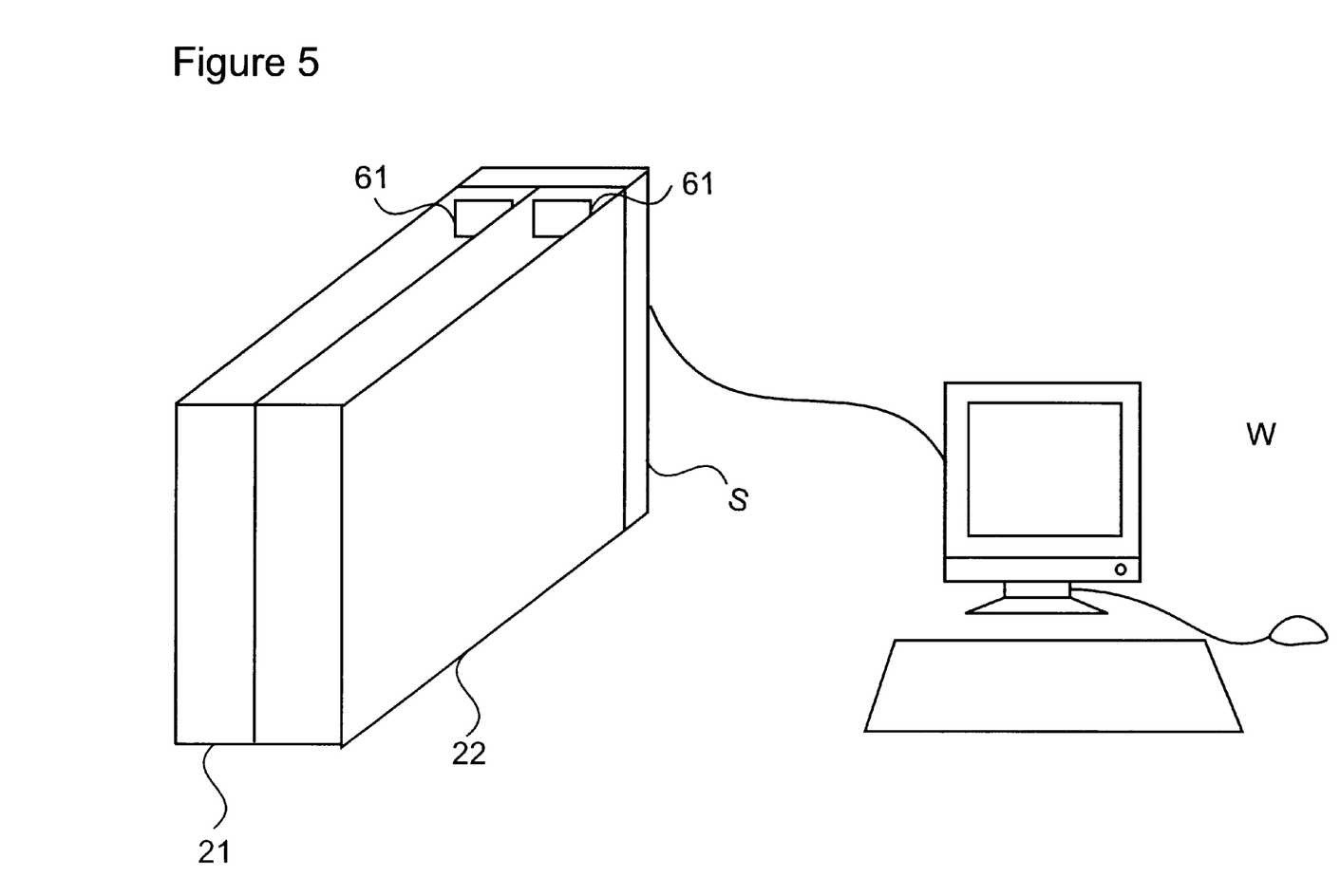
FIG. 5 is a simplified diagram of a system comprising two computers and a switch all housed within a same enclosure; and, FIG. 6 is a diagram showing a switch coupling two computers to a single printer for use in printing of secure and unsecured documents to a same printer.

Referring to FIG. 5, an embodiment of the invention wherein the selector S and both computers 21 and 22 are housed within a same housing. The housing is provided with sufficient isolation to prevent any cross-coupling from the secure computer 21 to the unsecured computer 22 and to the coupling systems connected to the either computer. The switching system operates in accordance with the above described invention. Such a system is highly advantageous. The use of a single housing to house the secure computer 21 and the unsecured computer 22 provides significant savings in terms of office space and improved overall security since one computer cannot be physically shifted relative to another so as to be closer to the other computer and thereby cross-couple therewith. Providing a more fool proof system for secure network management is advantageous.

Also, since the two systems are located within a same housing, an additional detector 61 is included in each computer and detects cross-coupling of signals within the computers. When the detection circuitry of the switch S or the additional detector detect a possibility of cross coupling, the computers are shut down as well as the selector S. Therefore, the chance of secure information passing out to the unsecured network become minimal. When only the selector S is provided with detection circuitry 51, moving the secure computer system 21 relative to the unsecured computer system 22 could, in theory, result in cross coupling from one computer to the other which would allow information to pass from the secure network to the unsecured network. This is unacceptable. With the additional detector 61, this possibility is further restricted.

Figure 6:
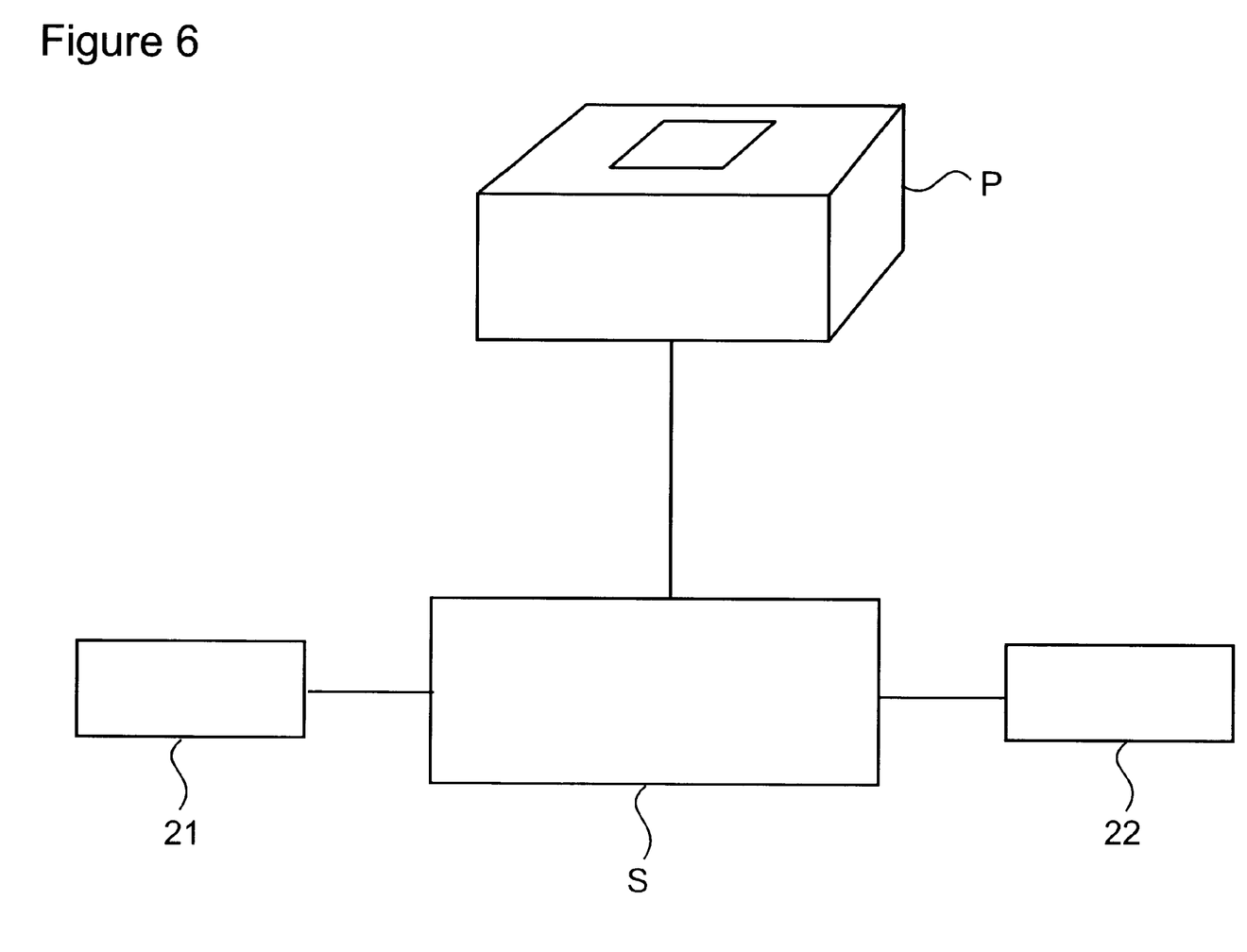

According to an embodiment shown in FIG. 6, the input/output device is a printer P.

Numerous other embodiments can be envisaged without departing from the spirit or scope of the invention.

What is claimed is:

1. A multi-computer input/output port switching system for accessing a plurality of computers from a single work centre, said work centre including at least one of a monitor, a keyboard and a printer, the switching system comprising:

a first coupling system for coupling to a first computer;

a second coupling system for coupling to a second computer;

a switch having a first port for coupling to the first coupling system, a second port for coupling to the second coupling system, and a third port for coupling to the at least one of a monitor, a keyboard and a printer, the switch for selecting one of signals received at the first port and signals received at the second port for provision to the third port; and, an isolator for electrically and electromagnetically isolating the first coupling system and the second coupling system one from the other.

2. A multi-computer input/output port switching system as defined in claim 1 wherein the switch is a manually operated physical switch.

3. A multi-computer input/output port switching system as defined in claim 2 wherein the switch comprises first isolating switches for coupling the first port with the first coupling system in a closed state and for isolating the first coupling system from the first port in an open state and second isolating switches for coupling the second port with the second coupling system in a closed state and for isolating the second coupling system from the second port in an open state, the isolating switches responsive to the switch.

4. A multi-computer input/output port switching system as defined in claim 3 wherein the switch is manually switched from a first switch setting in which first isolating switches are closed to a neutral state wherein the first and second isolating switches are open and then to another different active state wherein the second isolating switches are closed.

5. A multi-computer input/output port switching system as defined in claim 1 wherein the switch comprises first isolating switches for coupling the first port with the first coupling system in a closed state and for isolating the first coupling system from the first port in an open state and second isolating switches for coupling the second port with the second coupling system in a closed state and for isolating the second coupling system from the second port in an open state, the isolating switches responsive to the switch.

6. A multi-computer input/output port switching system as defined in claim 5 wherein the switch is manually switched from a first switch setting in which first isolating switches are closed to a neutral state wherein the first and second isolating switches are open and then to another different active state wherein the second isolating switches are closed.

7. A multi-computer input/output port switching system as defined in claim 1 wherein the isolator comprises a ground plane disposed between the first coupling system and the second coupling system and the switching system and wherein switching is performed using isolating switches that are physically separated when open.

8. A multi-computer input/output port switching system as defined in claim 7 wherein the switching system comprises optical couplers, the optical couplers for coupling signals provided to the first coupling system from a computer to the switching system in a first mode and for isolating the signals provided to the first coupling system from a computer from the switching system in a second other mode, the optical couplers.

9. A multi-computer input/output port switching system as defined in claim 7 wherein the switching system comprises relays, the relays for coupling signals provided to the first coupling system from a computer to the switching system in a first mode and for isolating the signals provided to the first coupling system from a computer from the switching system in a second other mode.

10. A multi-computer input/output port switching system as defined in claim 7 wherein the switching system comprises an analogue solid-state switch, the analog solid-state switch for coupling signals provided to the first coupling system from a computer to the switching system in a first mode and for electrically and electromagnetically isolating the signals provided to the first coupling system from a computer from the switching system in a second other mode.

11. A multi-computer input/output port switching system as defined in claim 1 comprising a housing;
   a first computer disposed within the housing;
   a second computer disposed within the housing and electrically and electromagnetically isolated from the first computer; and wherein the first coupling system, the second coupling system and the switch are housed within the housing.

12. A multi-computer input/output port switching system as defined in claim 1 wherein the isolator is formed for permanently electrically and electromagnetically isolating the first coupling system and the second coupling system one from the other to prevent data flow therebetween.

13. A multi-computer input/output port switching system as defined in claim 1 wherein the first coupling system includes a coupler for direct coupling with the first computer, and wherein the second coupling system includes a coupler for direct coupling with the second computer.

14. A multi-computer input/output port switching system for accessing a plurality of computers from a single work centre, said work centre including at least one of a monitor, a keyboard and a printer, the switching system comprising:
   a first coupling system for coupling to a first computer;
   a second coupling system for coupling to a second computer;
   a switch having:
      a first port for coupling to the first coulping system,
      a second port for coupling to the second coupling system, and
      a third port for coupling to the at least one of a monitor, a keyboard and a printer,
   the switch for selecting one of the first port and the second port for provision of a signal received at the third port; and,
   an isolator for electrically and electromagnetically isolating the first coupling system and the second coupling system one from the other to prevent data flow of the signal received at the third port to both the first and second ports.

15. A multi-computer input/output port switching system for accessing a plurality of computers from a single work centre, said work centre including input/output devices, the switching system comprising:
   a first coupling system for coupling to a first computer system;
   a second coupling system for coupling to second computer system;
   a switch having a first port for coupling to the first coupling system, a second port for coupling to the second coupling system, and a third port for coupling to the input/output devices, the switch for selecting one of signals received at the first port and signals received at the second port for provision to the third port;
   an isolator for electrically and electromagnetically isolating the first coupling system and the second coupling system one from the other; and,
   detection circuitry for detecting a presence of signals indicative of potential coupling between the first coupling system and the second coupling system within the switching system and for providing a control signal, the control signal indicative of potential coupling of signals from the first coupling system to the second coupling system.

16. A multi-computer input/output port switching system as defined in claim 15 comprising:
   means for disabling the switching system to prevent provision of signals from both of the first coupling system and the second coupling system when the control signal indicative of potential coupling of signals from the first coupling system to the second coupling system is provided.

17. A multi-computer input/output port switching system as defined in claim 15 wherein the control signal is provided in response to simultaneously received signals at each of the first port and the second port.

18. A multi-computer input/output port switching system as defined in claim 17 wherein the detection circuitry is included within the switch.

19. A multi-computer input/output port switching system as defined in claim 18 wherein the control signal is provided in response to signals from a coupling system other than the coupling system selected by the switch reaching the switch.

20. A multi-computer input/output port switching system for accessing a plurality of computers from a single work centre, said work centre including input/output devices:
   a housing having a first compartment, a second compartment, and a third compartment, each compartment shielded to provide electromagnetic isolation therebetween;
   a first coupling system for coupling to a first computer system, the first coupling system disposed within the first compartment and comprising a keyboard emulator, a mouse emulator, a plurality of isolating switches, and a first output port;
   a second coupling system for coupling a to second computer system, the second coupling system disposed within the second compartment and comprising a keyboard emulator, a mouse emulator, a second plurality of isolating switches, and a second output port;
   a switch disposed within the third compartment and having a first port for coupling to the first output port, a second port for coupling to the second output port, and a third port for coupling to the input/output devices, the switch manually operable for providing a control signal to each of the first coupling system and the second coupling system for selectively operating the first plurality of isolating switches and the second plurality of isolating switches wherein switching the first plurality of isolating switches to an closed state is only possible when the second plurality of isolating switches are in an open state.

* * * * *